Figure 3:
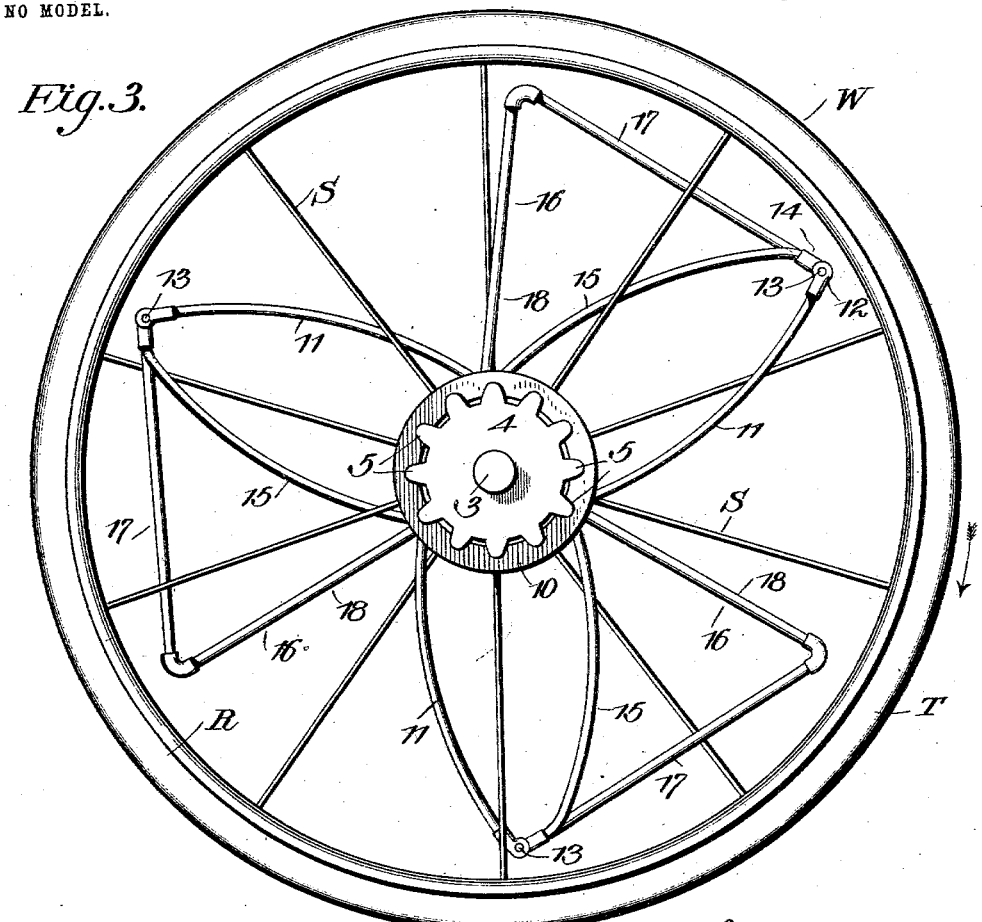

No. 746,754. PATENTED DEC. 15, 1903.
J. R. SNYDER.
VEHICLE WHEEL.
APPLICATION FILED OCT. 2, 1903.
NO MODEL. 2 SHEETS—SHEET 1.
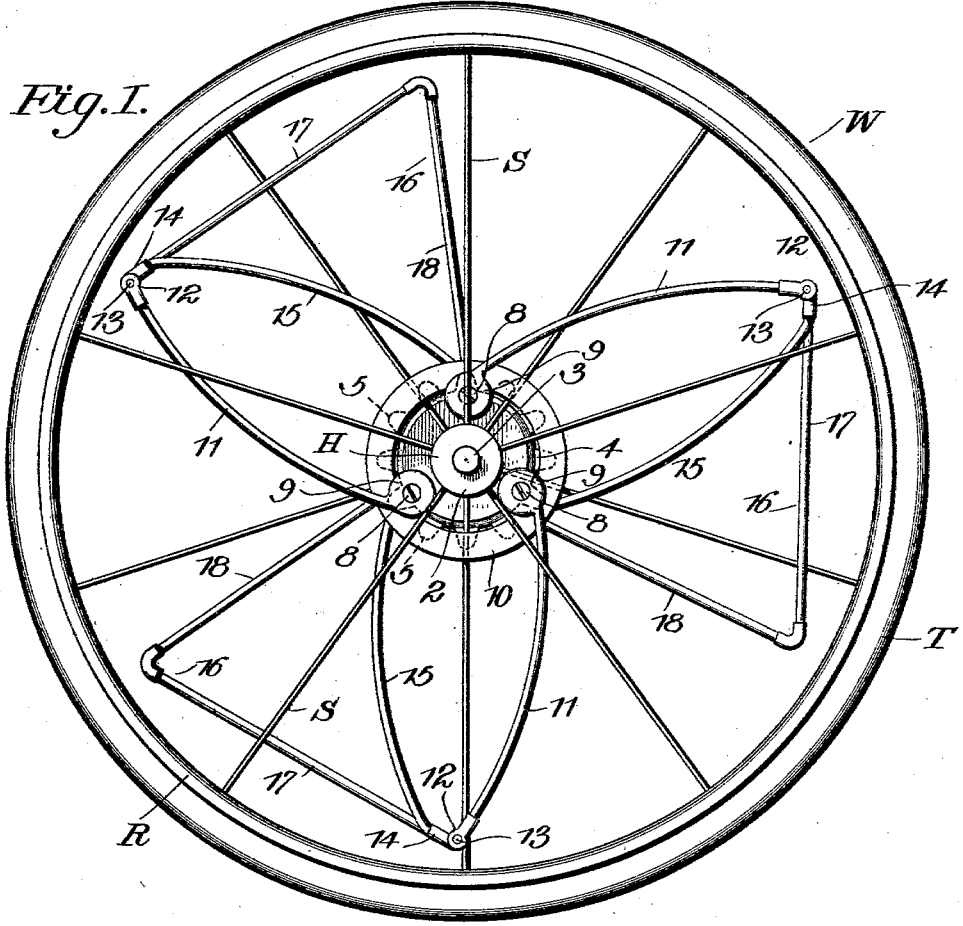
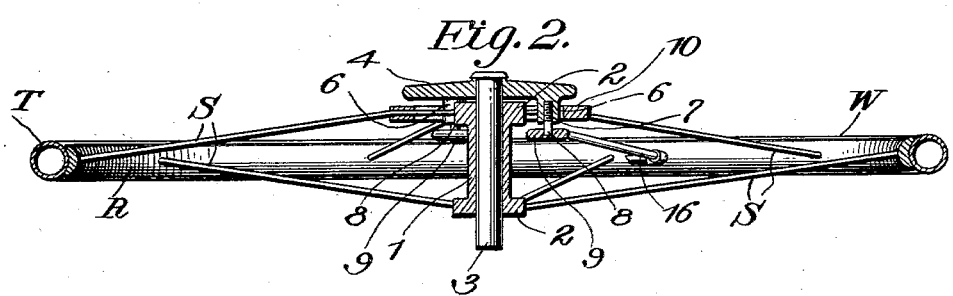
Witnesses
J. R. Snyder, Inventor.
Attorneys No. 746,754. PATENTED DEC. 15, 1903.
J. R. SNYDER.
VEHICLE WHEEL.
APPLICATION FILED OCT. 2, 1903.
NO MODEL. 2 SHEETS—SHEET 2.

Witnesses
E. F. Stewart
Buster Morton

J. R. Snyder, Inventor.
by C. A. Snow & Co.
Attorneys

No. 746,754. Patented December 15, 1903.

UNITED STATES PATENT OFFICE.

JAMES R. SNYDER, OF COLORADO SPRINGS, COLORADO.

VEHICLE-WHEEL.

SPECIFICATION forming part of Letters Patent No. 746,754, dated December 15, 1903.

Application filed October 2, 1903. Serial No. 175,519. (No model.)

*To all whom it may concern:*

Be it known that I, JAMES R. SNYDER, a citizen of the United States, residing at Colorado Springs, in the county of El Paso and State of Colorado, have invented a new and useful Vehicle-Wheel, of which the following is a specification.

This invention relates generally to vehicle-wheels, and more particularly to driving-wheels of the type in which a sprocket or other power-transmitting member is associated with the wheel to impart motion thereto when the sprocket or other power-transmitting member is driven by means of a motor or manual power.

The wheel is especially designed for use upon bicycles, but is also adapted for use upon motor-driven vehicles of any type in which it is a desideratum to have the power at starting transmitted to the wheel without shock.

The principal object of the invention is to improve the mode of transmitting power from a sprocket-wheel to a vehicle-wheel by providing a system of yielding arms extending out from the sprocket toward the periphery of the wheel and a system of arms pivotally connected with the first-mentioned arms at points adjacent to the periphery of the wheel and connected at their inner ends with the hub of the wheel, thereby effecting a gain in power.

Another object of the invention is to provide an elastic or resilient connection between the wheel structure and the sprocket or other power-transmitting member whereby the initial strain upon the wheel when power is applied to the structure will be gradually applied and the tendency to distort the wheel and loosen the elements thereof will be diminished.

A further object of the invention is to provide a yielding connection between the sprocket and the wheel, so that when power is applied to the chain which drives the sprocket the initial strain upon the chain will not be excessive, and hence will not be apt to break the chain.

Special objects of the invention are to provide in a driving-wheel means for yieldably connecting the sprocket with the wheel which will be well adapted to serve the general purposes above mentioned, which will not become disarranged or ineffective in service, and in which the parts will be always readily accessible, so that the broken parts may be readily replaced, if necessary.

With the above-stated objects and others in view, which will appear as the invention is more fully disclosed, the same consists in the construction and combination of parts of a vehicle-wheel hereinafter fully described and claimed, and illustrated in the accompanying drawings, in which corresponding parts are designated by the same characters of reference through the several views, it being understood that various changes in the form, proportions, and exact mode of assemblage of the elements may be made without departing from the spirit of the invention or sacrificing any of its advantages.

Figure 4:
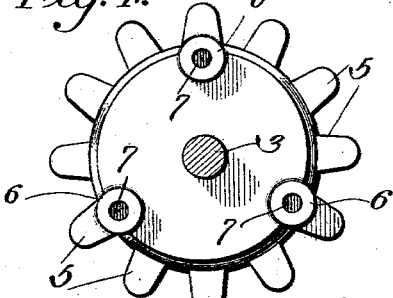
Figure 5:
Figure 6:
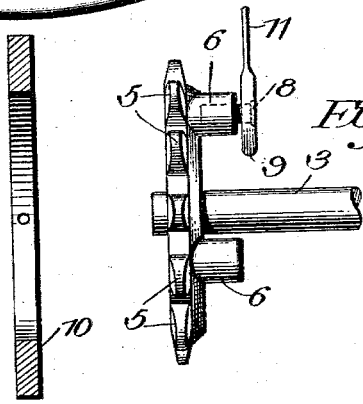

In the drawings, Figure 1 is a view of the wheel in side elevation, showing the attachment of the curved arms to the sprocket and ring. Fig. 2 is a horizontal section through the axis of the wheel as shown in Fig. 1. Fig. 3 is a side elevation of the wheel from the side opposite to that shown in Fig. 1. Fig. 4 is a detail view of the sprocket looking at the face opposite to that shown in Fig. 3. Fig. 5 is a detail transverse sectional view of the ring. Fig. 6 is a detail view, in side elevation, of the sprocket, a portion of the axle, and one of the arms attached to the sprocket.

Referring to the drawings in detail, W designates generally the vehicle-wheel, comprising the usual tire T, the rim R, spokes S, and hub H. The hub H is preferably of the form shown, comprising a sleeve 1 and flanges 2 at the ends, to which are secured the inner ends of the spokes S. The hub is centrally bored, as usual, for the passage of an axle 3, and upon the axle adjacent to the hub is supported for independent rotation a sprocket 4. The sprocket 4 is provided with the usual teeth 5 and has on the face adjacent to the hub H a plurality of studs 6, in this instance three in number, which are spaced equidistant and are located near the periphery of the sprocket, as best seen in Fig. 4.

The studs 6 are disposed parallel to the axle 3 and are provided in their ends with internally-threaded sockets 7 for the reception of screws 8, upon which are carried disks 9, whose purpose will presently be explained.

Rigidly associated with the spokes of the wheel upon the sides adjacent to the sprocket is a ring 10 of such internal diameter that the studs 6 on the sprocket will just pass through the ring, as best seen in Fig. 2, and the ring is of such thickness transversely that when the disks 9 are secured in position by means of screws 8 their outer faces contact with the ring and hold the sprocket in proper relation thereto.

The sprocket is, as above stated, mounted for rotation upon the axle 3 independently of the hub H; but its independent rotary movement is limited by the passage of the studs 6 between the spokes of the wheel upon the side adjacent to the sprocket. The independent rotation is further limited by connections between the sprocket and the wheel now to be described.

Each of the three disks 9 has rigidly attached thereto or formed integral therewith a curved arm 11, which projects outward toward the periphery of the wheel and bears at its end an eye 12, through which passes a pivot screw or bolt 13, which also passes through a similar eye 14 at the end of a curved arm 15, whose inner end is rigidly attached to the ring 10, as seen in Figs. 1 and 3, and which is curved oppositely to the arm 11. The two arms 11 and 15 form together a yielding lever-arm for imparting motion from the sprocket 4 to the wheel. A brace 16 in the form of an angular arm whose outer member 17 is disposed at right angles to a radius of the wheel and whose inner member 18 is disposed parallel with a radius thereof is rigidly associated at its outer end with the eye 14, carried by each curved arm 15, and at its inner end is rigidly attached to the ring 10 near the point of attachment of each arm 15. The curved arms 11 and 15 and the brace 16 are of slightly-resilient material, so that when the sprocket is rotated in the direction indicated by the arrow in Fig. 3 the arms 11 and 15 and the member 18 of the brace 16 will bend somewhat under the initial strain, and hence will prevent power being applied to the wheel with a sudden shock.

The disks 9 are all rotatable upon the screws 8, by which they are supported, and the rotary movement of the disks on the supporting-screws increases the resilient action of the curved lever-arm, composed of members 11 and 15, by permitting the arm 11 to yield more freely than it would if the disks were rigidly supported.

It will be readily seen by any one skilled in the art to which this invention pertains that when power is applied to the sprocket 4 it will be gradually transmitted to the wheel through the arms above described in detail and that after the first yielding under the initial strain the arms will tend to return to their normal positions and will therefore transmit to the wheel the full power exerted upon the sprocket without at any time producing upon the wheel structure or upon the chain through which power is transmitted to the sprocket such excessive strain as would distort the wheel, loosen the spokes in the hub or the rim, or damage the chain by permanently stretching or breaking it. It will also be observed that by making the members through which power is transmitted from the sprocket to the hub of the wheel relatively long a considerable degree of yielding will be permitted without greatly distorting the members or bending them beyond their limit of elasticity. Consequently the yielding connection between the sprocket and the wheel is one that will not lose its efficiency from constant use and one that will always be reliable in action unless subjected to strains in excess of those which the apparatus is designed to withstand. It will also be noted that the elements of the apparatus are comparatively few, that they are so arranged as to be at all times readily accessible, so that they may be readily replaced if through any accident any of them should become broken or unduly strained.

Having thus described the construction and operation of my invention, what I claim as new, and desire to secure by Letters Patent, is—

1. The combination with the hub of a vehicle-wheel, of a sprocket supported adjacent thereto, and independently rotatable, an outwardly-projecting resilient arm carried by said sprocket, a second outwardly-projecting resilient arm rigidly connected at its inner end with the wheel and pivotally connected at its outer end with the first-mentioned arm to form a resilient lever, and an angular brace member rigidly associated at its outer end with the second resilient arm and rigidly associated with the wheel at its inner end near the point of attachment of said second resilient arm.

2. The combination with a vehicle-wheel and the hub thereof, of a sprocket supported adjacent to the hub and independently rotatable, a pair of outwardly-projecting converging resilient arms, one attached at its inner end to the sprocket and the other rigidly connected with the wheel, said arms being pivotally connected at their outer ends to form a resilient lever and an angular brace member rigidly associated at its outer end with the arm carried by the wheel and rigidly attached at its inner end to the wheel near the point of attachment of the resilient arm.

3. The combination with a vehicle-wheel and the hub thereof, of a sprocket supported adjacent to the hub and independently rotatable, a pair of outwardly-projecting oppositely-curved resilient arms, one of said arms being attached at its inner end to the sprocket and the other being rigidly connected with the wheel, and both being pivotally connected at their outer ends, and an angular brace member rigidly associated at its outer end with one of said curved arms near its terminal and rigidly attached at its inner end to the wheel near the point of attachment of said curved arm.

4. The combination with a vehicle-wheel and the hub thereof, of a sprocket supported adjacent to the hub and independently rotatable, an outwardly-projecting resilient arm pivotally supported on said sprocket, a second outwardly-projecting resilient arm rigidly associated with said wheel and pivotally connected at its outer end with the first-mentioned arm to form a resilient lever, and an angular brace member rigidly associated at its outer end with the second resilient arm and rigidly attached at its inner end to the wheel near the point of attachment of said second resilient arm.

5. The combination with a vehicle-wheel and the hub thereof, of an axle upon which said hub is rotatable, a sprocket independently rotatable on said axle, an outwardly-projecting resilient arm carried by said sprocket, a second resilient arm rigidly connected with said wheel and pivotally connected at its outer end to the first-mentioned resilient arm, and an angular brace member rigidly associated at its outer end with the second resilient arm and rigidly associated at its inner end with the wheel near the point of attachment of said second resilient arm.

6. The combination with a vehicle-wheel and the hub thereof, of a ring rigidly associated with the spokes on one side of the wheel, at a distance from and concentric with the hub, a sprocket supported adjacent to the hub and independently rotatable, an outwardly-projecting resilient arm carried by the sprocket, a second resilient arm rigidly connected at its inner end with said ring and pivotally connected at its outer end with the first-mentioned resilient arm to form a resilient lever and an angular brace member rigidly connected at its outer end to one of said resilient arms adjacent to its pivotal point and rigidly connected at its inner end with said ring.

7. The combination with a vehicle-wheel and the hub thereof, of a ring rigidly attached to the spokes on one side of the wheel at a distance from the hub and concentric therewith, a sprocket having a plurality of studs on one face thereof adapted to pass through said ring, disks removably attached to the inner ends of said studs and engaging the inner face of said ring, a plurality of outwardly-projecting resilient arms carried by said sprocket, a corresponding number of outwardly-projecting resilient arms rigidly attached to said ring and pivotally connected to the outer ends of the first-mentioned resilient arms and a plurality of angular brace members associated one with each pair of resilient arms, being rigidly connected at their outer ends to one member of each pair of resilient arms and rigidly connected at their inner ends with said ring.

In testimony that I claim the foregoing as my own I have hereto affixed my signature in the presence of two witnesses.

JAMES R. SNYDER.

Witnesses:
   H. C. BOSSART,
   M. BOSWORTH.